(12) United States Patent
Wang et al.

(10) Patent No.: US 7,748,996 B2
(45) Date of Patent: Jul. 6, 2010

(54) SIGNAL EXCHANGE SYSTEM AND TRANSFORMING CONNECTOR THEREOF

(75) Inventors: Jun Wang, Taoyuan Hsien (TW); Xin-Hua Li, Taoyuan Hsien (TW); Han-Cheng Hsu, Taoyuan Hsien (TW)

(73) Assignee: Delta Electronics, Inc., Taoyuan Hsien, Taiwan (CN)

( * ) Notice: Subject to any disclaimer, the term of this patent is extended or adjusted under 35 U.S.C. 154(b) by 188 days.

(21) Appl. No.: 11/889,020

(22) Filed: Aug. 8, 2007

(65) Prior Publication Data
US 2008/0073980 A1    Mar. 27, 2008

(30) Foreign Application Priority Data
Sep. 22, 2006  (TW) .............................. 95135069 A

(51) Int. Cl.
*H01R 12/00* (2006.01)
*H05K 1/00* (2006.01)
(52) U.S. Cl. ........................................................ 439/79
(58) Field of Classification Search ................... 439/79, 439/49
See application file for complete search history.

(56) References Cited

U.S. PATENT DOCUMENTS

| | | | | |
|---|---|---|---|---|
| 4,249,229 A | * | 2/1981 | Hester | 361/752 |
| 4,939,623 A | * | 7/1990 | Equi et al. | 361/752 |
| 7,455,527 B2 | * | 11/2008 | Nordin et al. | 439/49 |

* cited by examiner

*Primary Examiner*—Javaid Nasri
(74) *Attorney, Agent, or Firm*—Birch, Stewart, Kolasch & Birch, LLP

(57) ABSTRACT

A signal exchange system includes a circuit board, a transforming connector and a network port. The transforming connector is electrically connected to the circuit board and includes at least one connecting terminal. The connecting terminal is electrically connected to an external device. The network port is disposed on the circuit board and electrically connected to the transforming connector for receiving a power signal transmitted from the transforming connector and transmitting a data signal.

21 Claims, 5 Drawing Sheets

SIGNAL EXCHANGE SYSTEM AND TRANSFORMING CONNECTOR THEREOF

CROSS REFERENCE TO RELATED APPLICATIONS

This non-provisional application claims priority under 35 U.S.C. §119(a) on Patent Application No. 095135069 filed in Taiwan, Republic of China on Sep. 22, 2006, the entire contents of which are hereby incorporated by reference.

BACKGROUND OF THE INVENTION

1. Field of Invention

The invention relates to a signal exchange system, and more particularly to a signal exchange system with power supply capability and a transforming connector thereof.

2. Related Art

Power over Ethernet (POE) is a technique for providing an operating power to a network terminal device through a network line. In the prior arts, only a part of wires in the network line are used to transmit data and the other part of the wires are unused. The POE technique can use the unused part of wires to transmit power. When the POE technique is applied to the network-switching device, the network-switching device can transmit power to the terminal network device (not shown in the figures) through the network line. Therefore, some small power terminal network devices, such as the power is smaller than 12.95 W, can retrieve the required power from the network line, therefore, additional power line is unnecessary.

Referring to FIG. 1, a conventional signal exchange system 1 with the POE function includes a circuit board 10, a power source connector 11, a transformer 12, a network port 13 and an external power source equipment (PSE) 14. The power source connector 11, the transformer 12 and the network port 13 are soldered on the circuit board 10 and form a transmission path on the circuit board 10. The transmission path connects the power source connector 11, the transformer 12 and the network port 13 in sequence. The external PSE 14 includes a power source 141, a switch 142 and a PSE control circuit 143. A power line 15 is electrically connected to the PSE control circuit 143 and the power source connector 11.

The power source 141 outputs a power signal P of 48 VDC, which is transmitted to the network terminal device through the switch 142, the PSE control circuit 143, the power line 15, the connector 11, the transformer 12, the network port 13 and a network line coupling with the network port 13 in sequence. Thus, the power source 141 can provide the power to the terminal network device.

However, in the above mentioned configuration, the circuit board 10 must include an individual power source connector 11 to receive the power outputted from the PSE control circuit 143. In addition, the circuit board 10 must include an individual transformer 12 to convert the power signal P, such as a voltage signal. Therefore, the power source connector 11 and the transformer 12 will occupy a certain space of the circuit board 10 so that the signal exchange system 1 can be not miniaturized.

In addition, the voltage of the power signal P transmitted between the power source connector 11 and the transformer 12 is higher than that of the data signal transmitted in the circuit board 10. Therefore, when the power signal P is transmitted to the circuit board 10, the data signal with lower voltage will be interfered critically and the transmission quality thereof will be decreased. Accordingly, a circuit board including at least six layers is needed to be used in the conventional signal exchange system 1, so that the power signal and the data signal can be respectively transmitted in the different layers. The interference caused by the two signals in the circuit board may be decreased by the above mentioned method, but the circuit layout may become difficult and the cost to manufacture the signal exchange system 1 is increased due to the extra layers (at least six layers) of the circuit board.

Therefore, it is an important subject to provide a signal exchange system with power supply capability to improve the above-mentioned drawbacks.

SUMMARY OF THE INVENTION

In view of the foregoing, the invention is to provide a signal exchange system and a transforming connector thereof which can reduce the interference caused by the power signal and the data signal in the circuit board.

In addition, the invention is to provide a signal exchange system and transforming connector thereof, which can reduce the difficulty to arrange the circuit layout and manufacturing cost of the circuit board.

To achieve above, the invention discloses a signal exchange system including a circuit board, a transforming connector and a network port. The transforming connector is electrically connected to the circuit board and includes at least one connecting terminal. The connecting terminal is connected to an external device. The network port is disposed on the circuit board and electrically connected to the transforming connector. In addition, the network port is electrically connected to the transforming connector through the circuit board.

The signal exchange system further includes a PSE control circuit, which is electrically connected to the transforming connector and outputs a power signal to the transforming connector. The transforming connector transmits the power signal, and the network port transmits data signal and the power signal.

To achieve above, the invention also discloses a transforming connector including a body and at least one connecting terminal. The connecting terminal is embedded in a socket of the body and electrically connected to an external device.

As mentioned above, in the invention, the transforming connector includes the connecting terminal for connecting the external wire which can be electrically connected to the PSE control circuit so that the transforming connector provides the functions of the transformer and connector. Moreover, the occupied space of the transforming connector on the circuit board is less than the conventional transformer and power source connector so as to miniaturize the signal exchange system. Accordingly, the difficulty of arranging the circuit layout and the manufacturing cost can be reduced. In addition, the connecting terminal of the transforming connector of the invention can be directly connected to the PSE control circuit through the external wire and the connecting terminal can thus receive the power signal. Therefore, the power signal can be transmitted to the transforming connector without passing through the circuit board of the signal exchange system. Accordingly, the interference caused by the power signal and the data signal in the circuit board can be reduced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
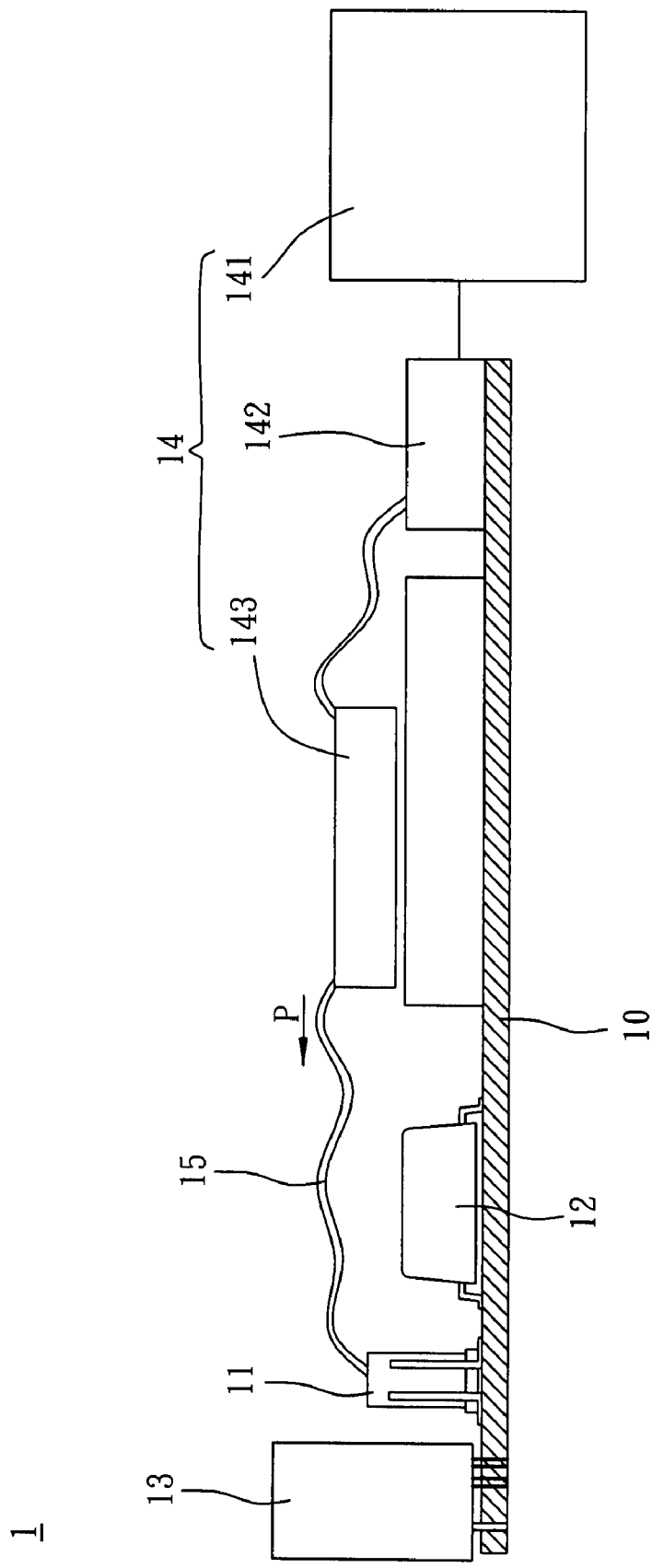
FIG. 1 is a schematic illustration showing a conventional signal exchange system.
Figure 2:
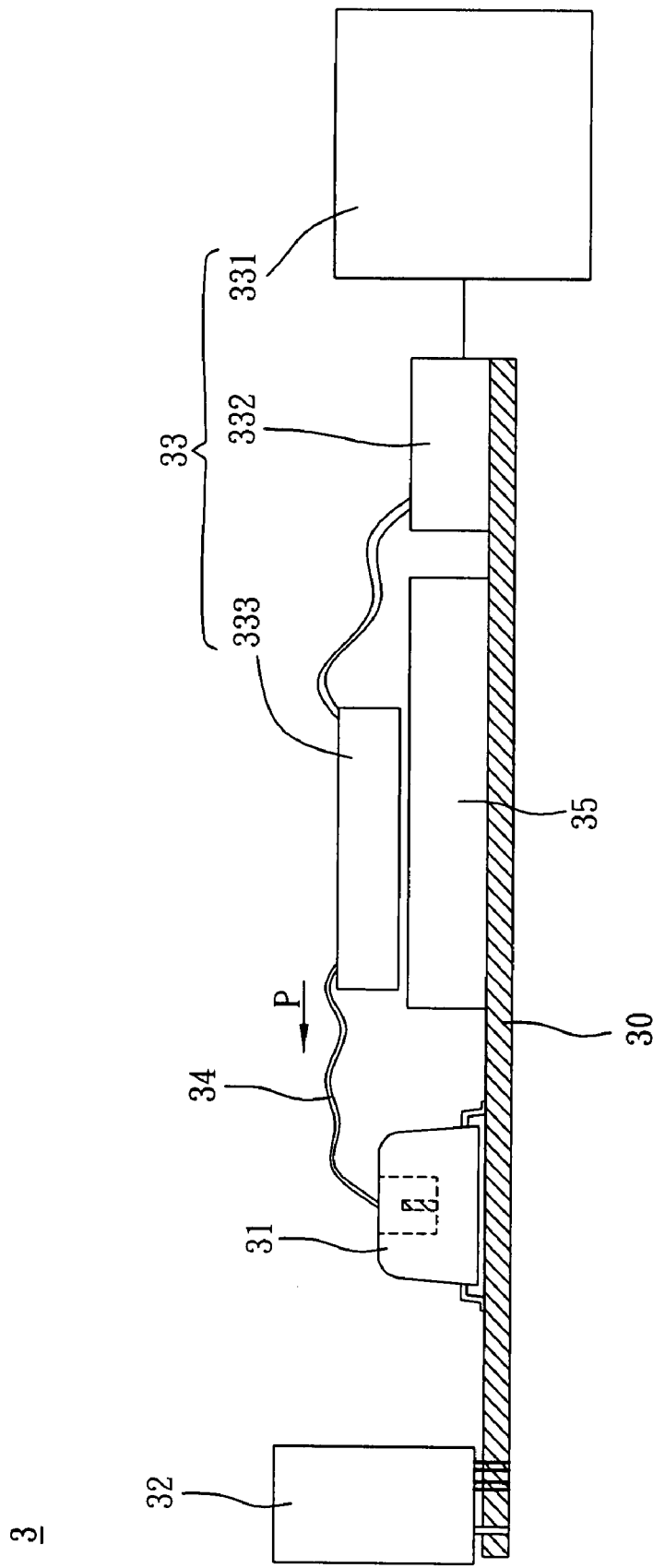
FIG. 2 is a schematic illustration showing a signal exchange system according to an embodiment of the invention.
Figure 3:
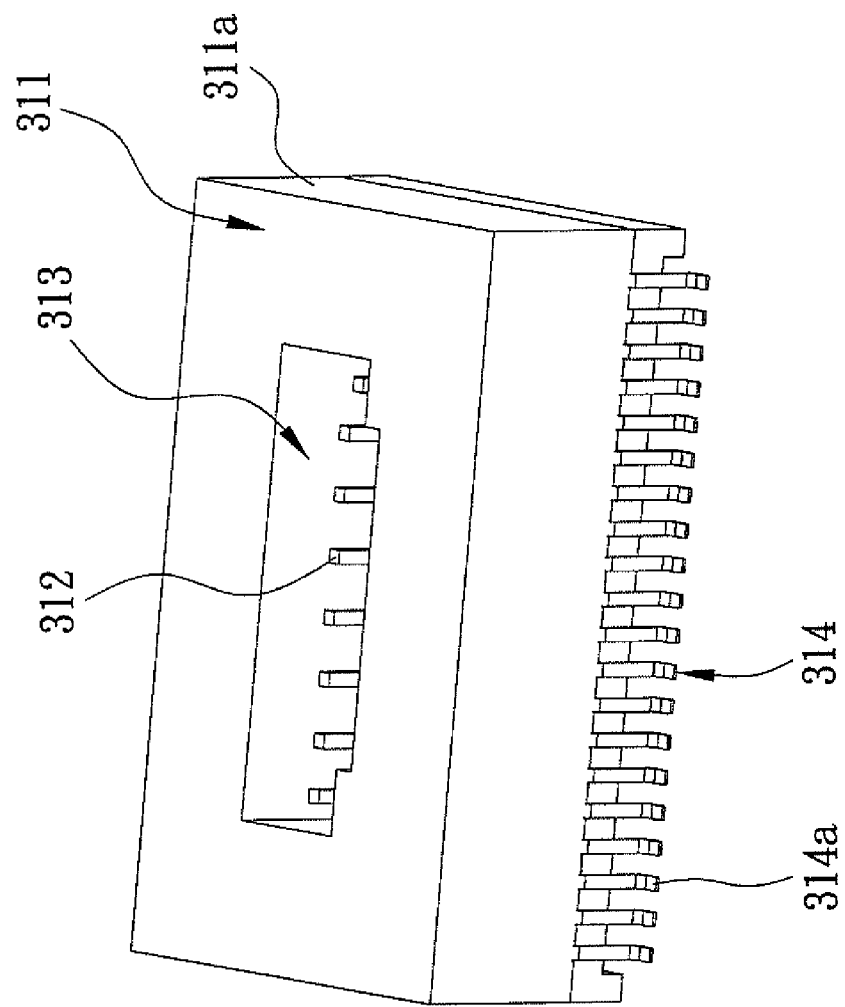
FIGS. 3 and 4 are solid diagrams showing a transforming connector according to the embodiment of the invention.

Referring to FIGS. 2 and 3, a signal exchange system 3 according to an embodiment of the invention includes a circuit board 30, a transforming connector 31 and a network port 32. In the embodiment, the signal exchange system 3 is a switching device, a router, a hub, a gateway, an IP sharing device or a network card. The circuit board 30 can be a printed circuit board or a build-up (or multi-layer) circuit board.

Figure 4:
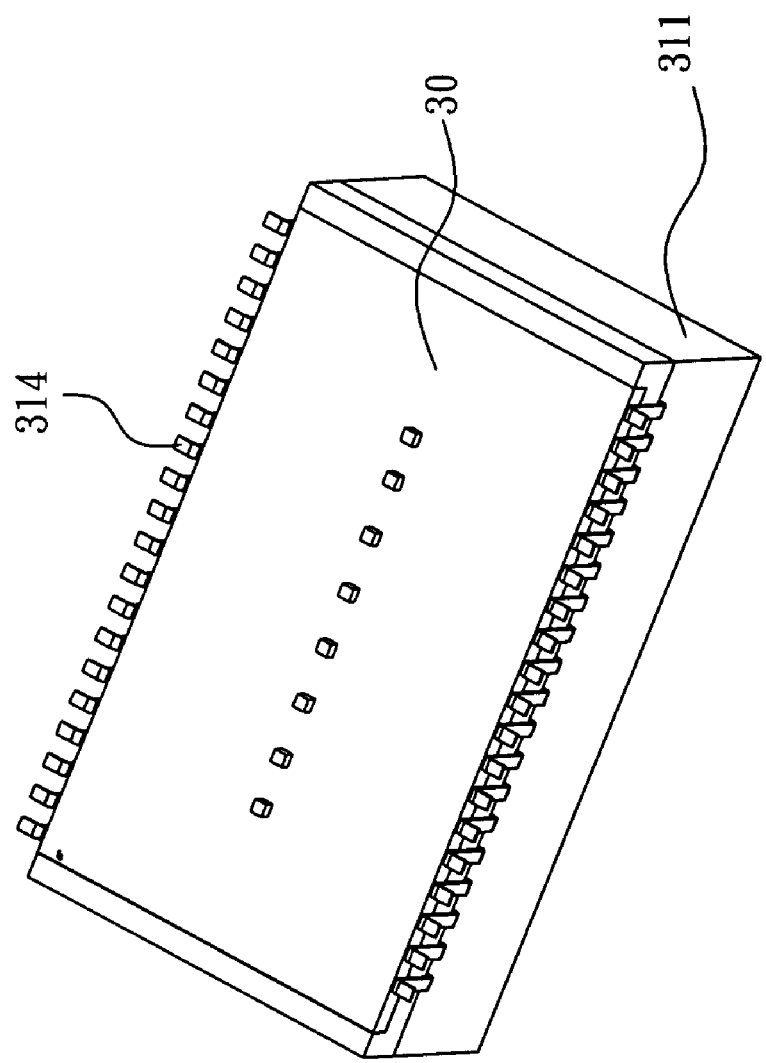
Figure 5:
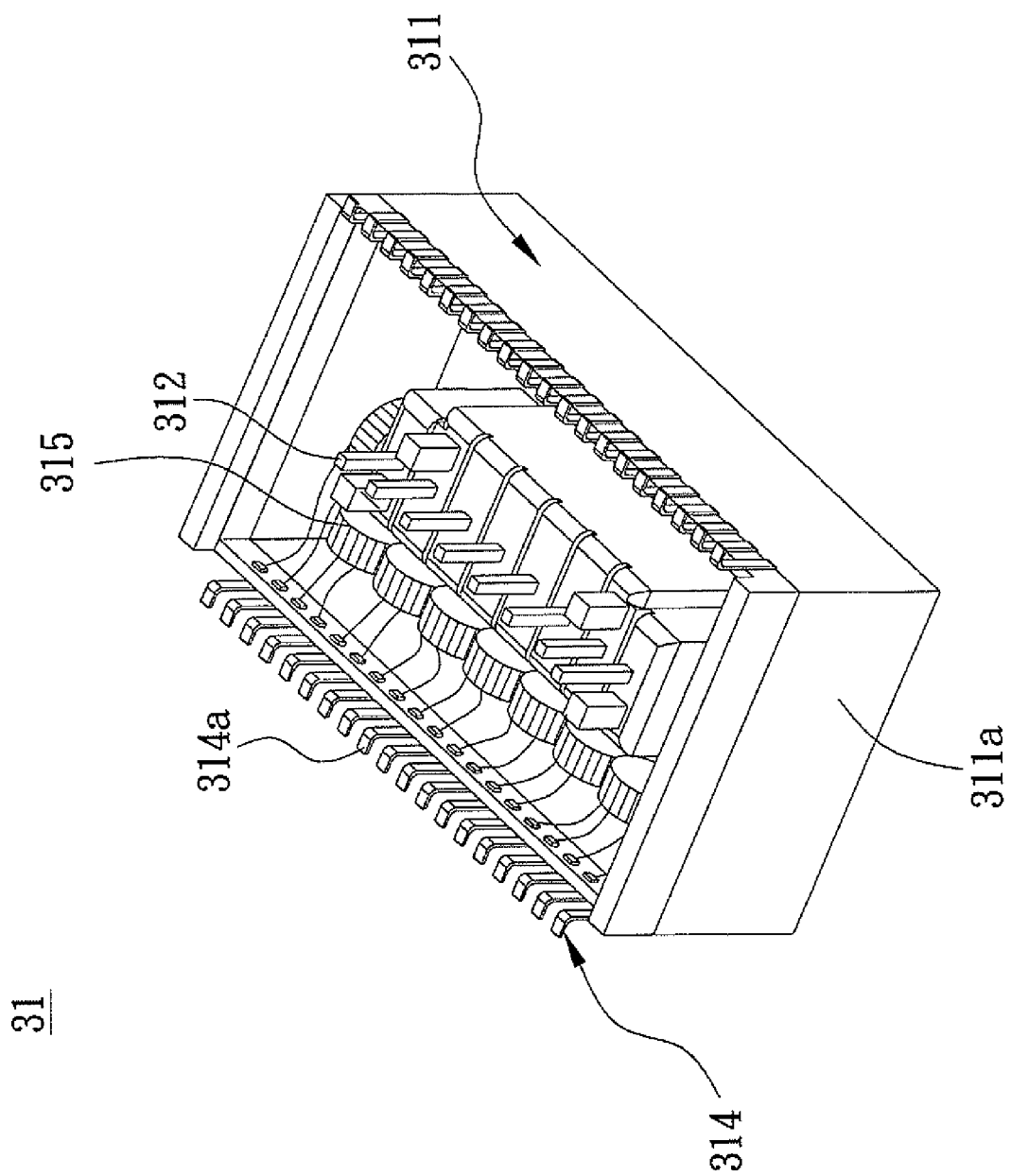
FIG. 5 is a bottom view of the transforming connector according to the embodiment of the invention.

The transforming connector 31 is electrically connected to the circuit board 30. As shown in FIGS. 3 to 5, the transforming connector 31 includes a main body 311, at least one transforming structure 315, at least one connecting lead 314 and at least one connecting terminal 312. The transforming structure 315 is located in the main body 311, and electrically connected to the connecting lead 314 and the connecting terminal 312. The main body 311 further includes a socket 313 located on a side of the main body 311. The connecting terminal 312, which is electrically connected to an external device 33, is embedded in the socket 313 to be a signal input terminal. In addition, the connecting lead 314 is electrically connected to the circuit board 30 to be a signal output terminal. For example, the connecting lead 314 can be electrically connected to the network port 32 through the circuit board 30. The circuit board 30 not only can provide the reliable connection with the connecting lead 314, but also can construct one sidewall of the transforming connector 31 (as shown in FIG. 4). Moreover, the transforming connector 31 can be connected to the circuit board 30 after packaging. The socket 313 and the main body 311 can be formed by injection molding. In the embodiment, the socket 313 is disposed on the top surface of the transforming connector 31, and, it can be disposed on any other surface of the transforming connector 31.

Please referring to FIG. 5 showing a bottom view of the transforming connector 31. In the embodiment, the transforming structure 315 is a transforming coil. Each of the connecting lead 314 and the connecting terminal 312 is a Z-type, L-type, pin-type or SMD terminal. In addition, please referring to FIGS. 2-5, the body 311 has a housing 311a, the transforming structure 315 is disposed in the housing 311a, the connecting lead 314 protrudes out from the housing 311a, and the outer portion 314a of the connecting lead 314 is connected with the circuit board 30.

As shown in FIG. 2, the external device 33 is a power source system for providing a power signal P. In the embodiment, the external device 33 includes a power source 331, a switch 332 and a power source equipment (PSE) control circuit 333. The switch 332 is electrically connected to the power source 331 and the PSE control circuit 333. The switch 332 controls the power inputted from the power source 331 to the PSE control circuit 333, and then the PSE control circuit 333 outputs the power signal P. The PSE control circuit 333 and/or the switch 332 can be integrated in the circuit board 30 or can be an individual circuit structure out of the circuit board.

With reference to FIGS. 2 and 3, the PSE control circuit 333 is electrically connected to the transforming connector 31. In the embodiment, the power signal P is transmitted from the PSE control circuit 333 to the transforming connector 31 through an external wire 34, which is connected to the connecting terminal 312 of the transforming connector 31. Thus, the transforming connector 31 can receive the power signal P from the PSE control circuit 333. The external wire 34 is a power line, which includes a male plug or a female plug and can be plugged into the socket 313 depending on the design of the socket 313 of the transforming connector 31. To be noted, the above description is for illustration only and the invention is not limited to this embodiment. For example, the power source system 33 can be connected to the transforming connector 31 by using a cable or other wires.

Referring to FIG. 2, the network port 32 is disposed on the circuit board 30 and electrically connected to the transforming connector 31 to receive the power signal P. Thus, the transforming connector 31 can be electrically connected to the network port 32 through the circuit board 30. When a network line couples to the network port 32, the network port 32 can transmit the data signal and output the power signal P to a powered device through the network line. In other words, the network port 32 can transmit the data signal and the power signal P, so that the power signal P provides the power for driving the powered device. In the embodiment, the network port 32 is an RJ-11 port, an RJ-12 port, an RJ-45 port or a USB port.

In addition, the signal exchange system 3 further includes a network-switching circuit 35, which is electrically connected to the network port 32 for performing a coding process, a routing process or a transmitting process. The processed data is transmitted to the terminal equipment through the network line and the network port 32. Moreover, the data signal of the terminal equipment can be transmitted to the network-switching circuit 35 through the network line and the network port 32.

In the embodiment, the transforming connector 31 is composed of the integrating transformer and connector so that the signal exchange system 3 can consist of the transforming connector 31 instead of the individual transformer and connector. The space occupied by transforming connector 31 is less than that occupied by the conventional transformer and the connector so that the size of the signal exchange system 3 of the embodiment can be reduced.

In addition, since the transformer and the connector are integrated as a transforming connector 31, the power signal P from the external device 33 can be transmitted to the transforming connector 31 without passing through the circuit board 30. Therefore, the signals, such as the data signal, can be prevented from being interfered by the power signal P so as to increase the quality for transmitting signal. Furthermore, the circuit board with fewer layers can be used in the invention so as to reduce the manufacturing cost of the signal exchange system 3 and increase the yield, rate thereof.

In summary, in the invention, the transforming connector includes the connecting terminal for connecting the external wire so that the transforming connector provides the functions of the transformer and connector. Moreover, the occupied space of the transforming connector on the circuit board is less than the occupied space of the conventional transformer and connector so as to miniaturize the signal exchange system. Accordingly, the difficulty to arrange the circuit layout and manufacturing cost can be reduced. In addition, the transforming connector of the invention can be directly connected to the external power source and the PSE control circuit through the connecting terminal and thus receive the power signal. Therefore, the power signal can be transmitted to the transforming connector without passing through the circuit board of the signal exchange system. Accordingly, the interference caused by the power signal and the data signal in the circuit board can be avoided.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the scope of the present invention.

What is claimed is:

1. A signal exchange system comprising:
   a circuit board;
   a transforming connector having a body, a plurality of transforming structures, at least one connecting terminal electrically connected to an external device and at least one connecting lead connected to the circuit board, wherein the connecting lead and the connecting terminal are disposed at the body, wherein the body has a housing, the plurality of transforming structures are disposed inside the housing, the connecting lead protrudes out from the housing, and an outer portion of the connecting lead is connected with the circuit board; and
   a network port disposed on the circuit board and electrically connected to the transforming connector.

2. The signal exchange system according to claim 1, wherein the external device comprises a power source system.

3. The signal exchange system according to claim 2, wherein the power source system comprises a power source and a power source equipment control circuit.

4. The signal exchange system according to claim 3, wherein the power source equipment control circuit is integrated in the circuit board or is an independent circuit structure of the circuit board.

5. The signal exchange system according to claim 3, wherein the power source system further comprises a switch electrically connected to the power source and the power source equipment control circuit.

6. The signal exchange system according to claim 5, wherein the switch and/or the power source equipment control circuit are/is integrated in the circuit board.

7. The signal exchange system according to claim 5, wherein the switch and/or the power source equipment control circuit are/is an independent circuit structure of the circuit board.

8. The signal exchange system according to claim 3, wherein the connecting terminal is electrically connected to the power source equipment control circuit.

9. The signal exchange system according to claim 3, wherein the transforming connector is connected to the power source equipment control circuit through an external wire, a power line or a cable.

10. The signal exchange system according to claim 1, wherein the transforming connector comprises at least one transforming structure or a coil located in the transforming connector and electrically connected to the connecting lead and the connecting terminal.

11. The signal exchange system according to claim 1, wherein the connecting lead or the connecting terminal is a Z-type terminal, an L-type terminal, a pin-type terminal or an SMD terminal.

12. The signal exchange system according to claim 1, wherein the transforming connector comprises a body and a socket located at a surface of the body, and the connecting terminal is embedded in the socket.

13. The signal exchange system according to claim 12, wherein the socket and the body are formed by an injection-molding method.

14. The signal exchange system according to claim 1, wherein the network port is an RJ-11 port, an RJ-12 port, an RJ-45 port or an USB port, and the signal exchange system is a switch, a router, a hub, a gateway, an IP sharing device or a network card.

15. The signal exchange system according to claim 1, wherein the circuit board is a printed circuit board or a build-up circuit board or a multi-layer circuit board.

16. The signal exchange system according to claim 1, further comprises a network switch circuit electrically connected to the network port for performing a coding process, a routing process or a transmitting process.

17. A transforming connector comprises:
   a body;
   a plurality of transforming structures located in the body;
   at least one connecting lead electrically connected to a circuit board; and
   at least one connecting terminal electrically connected to an external device and the transforming structures, wherein the transforming structures are electrically connected to the connecting lead and the connecting terminal, wherein the body has a housing, the transforming structures are disposed inside the housing, the connecting lead and the connecting terminal are disposed at the body, wherein the connecting lead protrudes out from the housing, and an outer portion of the connecting lead is connected with the circuit board.

18. The transforming connector according to claim 17, wherein the body includes a socket, and the connecting terminal is embedded in the socket.

19. The transforming connector according to claim 18, wherein the socket and the body are formed by an injection-molding method.

20. The transforming connector according to claim 17, wherein the connecting lead and/or the connecting terminal are/is a Z-type terminal, an L-type terminal, a pin-type terminal or an SMD terminal.

21. The transforming connector according to claim 17, wherein each of the transforming structures comprises a coil.

* * * * *